United States Patent [19]

Faehnle

[11] Patent Number: 4,557,204

[45] Date of Patent: Dec. 10, 1985

[54] PROCESS AND APPARATUS FOR TREATING WASTE MATERIALS

[75] Inventor: Erich Faehnle, Aalen/Unterkochen, Fed. Rep. of Germany

[73] Assignee: PKA Pyrolyse Kraftanlagen GmbH, Aalen, Fed. Rep. of Germany

[21] Appl. No.: 610,679

[22] Filed: May 16, 1984

[30] Foreign Application Priority Data

May 18, 1983 [DE] Fed. Rep. of Germany ....... 3317985
Dec. 30, 1983 [DE] Fed. Rep. of Germany ....... 3347554

[51] Int. Cl.⁴ .............................................. F23G 5/02
[52] U.S. Cl. ................................. 110/346; 48/197 R; 48/209; 110/222; 110/229
[58] Field of Search ............... 110/346, 229, 259, 171, 110/347, 246, 222; 48/209, 197 R, 197 A; 252/373

[56] References Cited

U.S. PATENT DOCUMENTS 4,028,068 6/1977 Kiener .................................. 48/209
4,042,345 8/1977 Anderson .......................... 252/373 X
4,359,949 11/1982 Moore ................................. 110/171
4,302,146 6/1983 Tornegard .......................... 110/229

Primary Examiner—Edward G. Favors
Attorney, Agent, or Firm—Walter H. Schneider

[57] ABSTRACT

Comminuted waste material is introduced in the form of briquettes, pellets or granulates into a gastight rotating drum for the recovery of useful gas by pyrolysis. The size of the briquettes, pellets or granulates is from about 1 to 50 mm and they are brought to a dry substance content of more than 70%.

12 Claims, 8 Drawing Figures

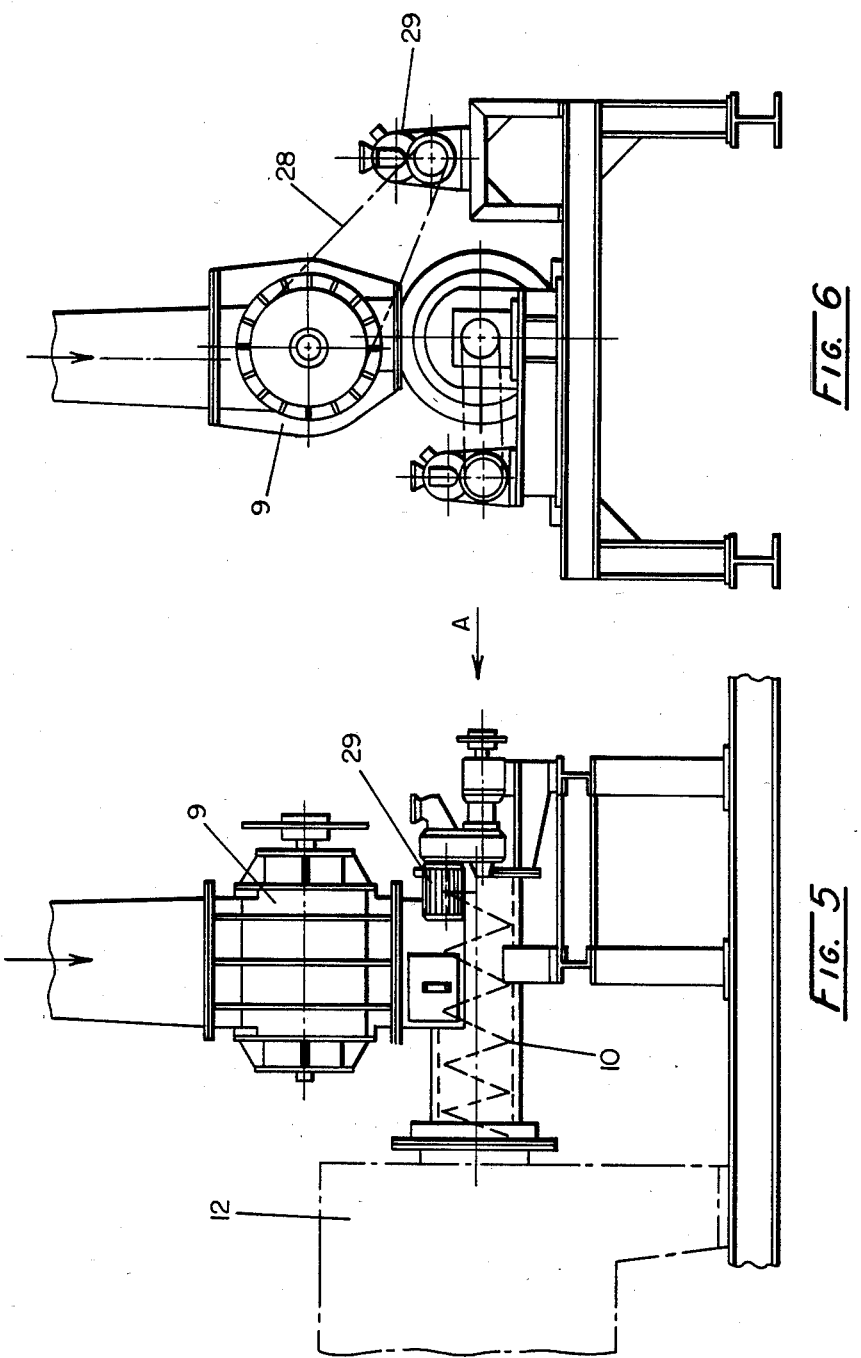

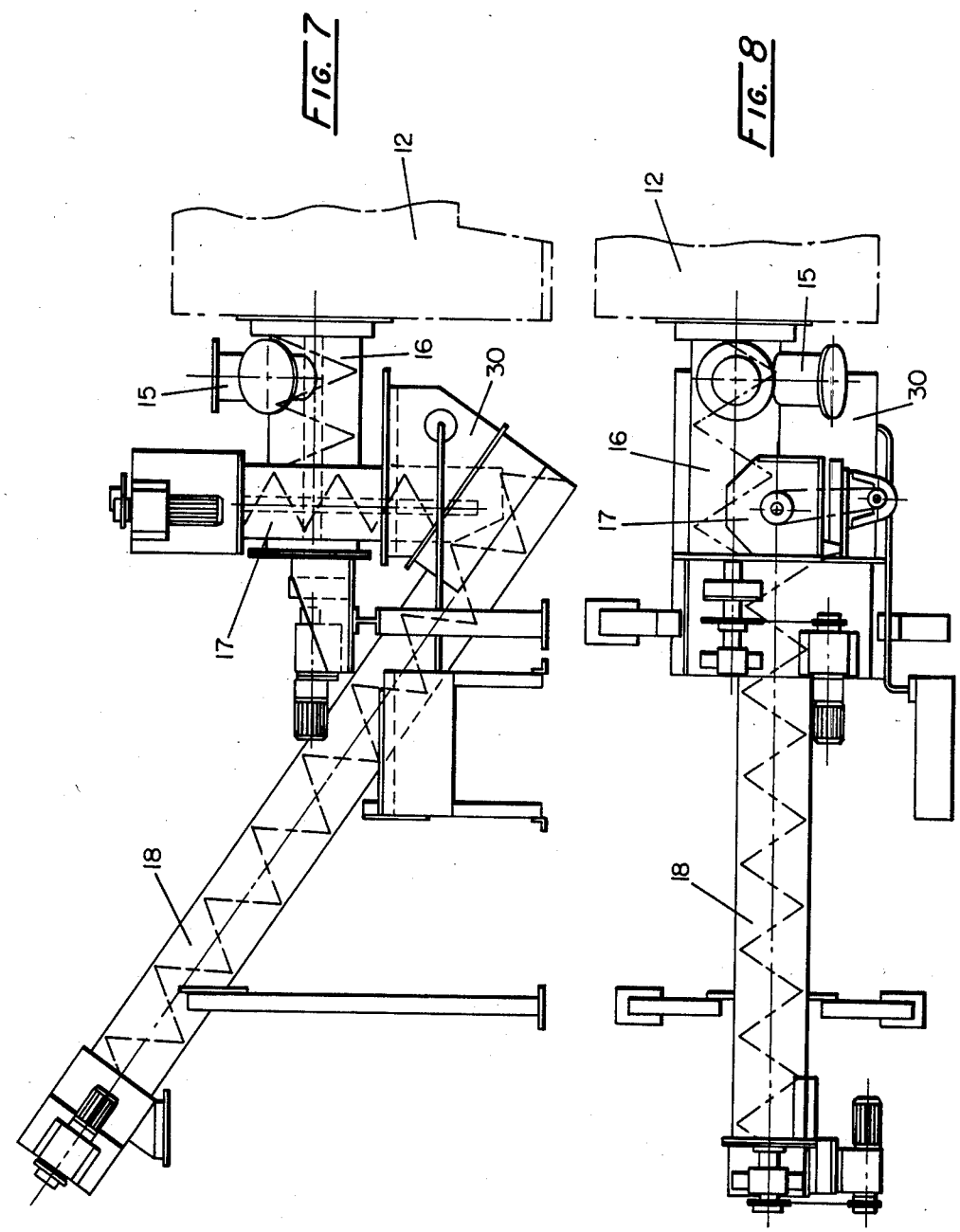

PROCESS AND APPARATUS FOR TREATING WASTE MATERIALS

BACKGROUND OF THE INVENTION

1. Field of the Invention

The present invention relates generally to improvements in or relating to the treatment of waste or refuse materials for the recovery of useful gases therefrom. More particularly, the present invention relates to the process for the recovery of useful gases from waste materials by pyrolysis or similar thermal decomposition methods, in which the comminuted material is introduced into a heated, gastight drum or vessel for the production of the gases. Residual substances, such as ashes and other particulate materials, are separated from the gas and the latter is treated in a gas converter in the presence of air and heat for the production of combustion gases. The present invention also relates to the apparatus for carrying out the method of the invention.

2. Description of the Prior Art

A method for treating waste materials and the apparatus therefor have been described in German Pat. No. 2 432 504. In general terms, during the pyrolysis of waste, for example household garbage, industrial wastes and the like, the contained organic components are volatilized and degassed. The recovered gas is then further treated in additional steps to such an extent that it is useful in the operation of gas turbines and gas motors. Similarly, the gas may be of use in chemical operations as synthesis gas for new products, or for the utilization of the calorific value, as by-pass in boiler installations, or in the operation of large heating plants.

The production of such gases is normally by means of a horizontally disposed vessel or treatment drum which is rotating about its longitudinal axis which is slightly inclined with respect to the horizontal. The reactor, or drum, is gastight, and the operating temperature in it is maintained over the range of from about 450° to about 600° C., under the exclusion of oxygen and using indirect heating. The hitherto known processes normally used shredded wastes as the feed material. The gastightness was achieved by a corresponding valve means at the two ends of the drum, which therefore was generally operating in a discontinuous or batch manner. At the temperatures mentioned above, a complete decomposition is achieved of even the most difficult to treat materials when oxygen is substantially excluded. The remaining residue is comprised of ashes, metals, glass, degassed wood and coal residues, the so called low-temperature coke.

The gases won in this processing are subsequently treated in a gas converter or similar reactor. This processing may include partial combustion to heat the gas to a cracking temperature in the range of from about 1100° to about 1200° C. During cracking the long-chain hydrocarbons are converted to methane and hydrogen, and other simple hydrocarbons. Simultaneously, there is achieved a partial separation of the water, contained in the vapor phase in the gas mixture, into hydrogen and oxygen. During dissociation the gases are passed through a bed of hot coal in which the further reactions occur. The resulting gas mixture exits from the converter and is usually used after leaving a gas cooling and purification system.

The pretreatment and introduction of the waste materials into the reactor drum, and the removal of residues therefrom, has often lead to difficulties and was otherwise not satisfactory. Thus, heretofore, the collected wastes were roughly comminuted in a shredder and then conveyed to a storage by a belt conveyer. In conformity with the requirements at hand, the comminuted waste was then introduced from a large hopper into the treatment vessel, with the end of the hopper enclosing in an airtight manner the end of the treatment vessel. A considerable disadvantage of the known process resides therein that due to the moisture content in the waste a considerable amount of water is produced. This water is generally separated in the cooling and purification stage. The amount of water may be in excess of 0.5 m$^3$ per ton of waste. Because the waste water contains an appreciable amount of deleterious substances, a cost-intensive purification is necessary. Furthermore, due to the high water content in the waste, a high energy input is required for the thermal processing, so that, in general, continuous indirect heating of the reactor drum will be required in order to maintain the desired conditions.

A further disadvantage of the known processes and apparatuses resides therein that decomposition of the material takes place during the intermediate storage of the shredded waste, and valuable energy stored in the material is then lost during extended periods of storage.

It is further of disadvantage in the known apparatuses that the waste may contain lengthy and spinning-prone substances, such as nylon stockings, ropes, synthetic/plastic strips, and the like. Such materials will disrupt the operation because they will get caught in feeder parts and on rotating parts. The removal of residues from the drum is also difficult in the known apparatuses. These residues are produced at a temperature in the range of from about 450° to about 600° C., and they are more or less bone-dry. Because they are difficult to transport in this state, there arises the need to moisten such residues, so that they will not become an environmental concern during transport or in storage, due to their capability to be easily carried by wind and air.

SUMMARY OF THE INVENTION

There has continued to remain, therefore, a need for improving the treatment of waste materials or similar residues.

It is accordingly an object of the present invention to provide an environmentally acceptable and energy-conserving process for the recovery of useful gases from waste materials by pyrolysis, as well as an apparatus for carrying out the process, with the operation of these to be substantially free of disruptions and to be conducive to automation.

In accordance with the primary feature of the invention these objects are achieved by compacting the waste material into briquettes, pellets, or granulates, and introducing these into the treatment drum or vessel.

In accordance with the teachings of the invention, the mixture is not comprised of more or less coarsely shredded waste, but the waste is compacted into small briquettes, pellets, or granulates in a press which may be of known construction. This processing provides unexpected advantages.

For one, high temperaures are realized during the compacting due to the frictional heat, which temperatures are sufficiently high to destroy bacteria. As well, briquettes, pellets, or granulates with a high dry-substance content are obtained.

In the following the term granulates is to include shapes such as briquettes, pellets, and granulates, or similar shapes.

A further advantage of the invention resides therein that feeding of the granulates into the treatment drum is easily carried out because spinning or rotating materials are eliminated in the feed material.

In accordance with a preferred embodiment of the invention the granulates are produced with a size of from about 1 to about 50 mm. At this size, glass, rocks, metal pieces and the like, are comminuted to such an extent that they will not detrimentally affect the processing, as long as such components were not sorted out prior to compacting in the press. Furthermore, this method of preparing the feed for the drum has the advantage that the drum entry can be of simple construction and, consequently, of lesser cost. Thus, a large feed hopper will be superfluous. The granulates can be fed by means of a bucket-wheel valve, or similar feed valve which prevents entry of air into the drum. The feed valve can be controlled by a drive which in turn is controlled in conformity with the amount of feed to be introduced into the drum.

A further inventive and preferred embodiment of the process resides therein that through granulating and compacting the waste material is brought to a dry-substance content of greater than 70%. In accordance with a further preferred embodiment, the granulates are dried in a subsequent drying step to a dryness corresponding to a dry-substance content of greater than 84%. This may be done by utilizing hot vapors produced during compacting and an associated heat exchanger.

The resultant granulates can be stored over extended periods of time, they do not decompose, and no waste water is produced. These are environmentally important factors. Any residual moisture is substantially carried in the gases produced and is used in the cracking of the gases.

In advantageous manner an oxygen-containing gas, e.g., air, is added to the drum which is at an interior temperature below about 500° C., for sub-stoichiometric combustion of part of the waste material. The supply of the oxygen-containing gas is controlled in such a way that the temperature of the system is brought to and maintained at a temperature in the range of from about 500° to about 600° C.

This feature allows in a simple manner the conservation of energy because combustion energy or heat is utilized as source energy.

Water or steam can be added for the control of the moisture content of the gas mixture produced in the drum. The addition may be made directly into the drum, or into a subsequent gas collector. If desired, water from an overflow of a gas cooling and purification system, which follows the gas converter, may be used, and a special water supply is then superfluous.

Further conservation of energy is realized when heating of the treatment drum or vessel is by means of the hot gases leaving the gas converter. This may be, for example, by use of a gas burner which is operated by combustion gas and which heats the gases which are circulating through a conduit system within the drum. As well, the combustion gas, which is at a temperature of from about 500° to about 700° C. and which is to be cooled to a lower value anyhow, may be used to reheat the gases for the treatment drum, by use of suitable heat exchangers.

Compacting or pressing of the waste material into briquettes, pellets, or granulates, is done in a screw press, for example, a thermal-screw press.

According to a preferred embodiment of the invention the drum is furnished, independently of the waste introduction means, at the residue removal end with a transport or exit screw, which, in turn, is operatively connectible to a quenching bath, for example, a water bath. The water bath, in turn, is furnished with a residue conveyer means which transports the quenched residue to a storage.

Whereas heretofore the residue was removed through a bucket-wheel valve from the treatment drum, in accordance with the present invention the residue is passed to the water bath and is then removed therefrom. Thus, dry ashes are not produced, but the residue material is wet and easily stored in this manner. At the same time, the water bath ensures air-tightness with respect to the interior of the treatment drum.

The residue conveyer means at the outlet or exit end, or residue removal end, of the drum can be furnished in various ways. It is only of importance that the residue is introduced into the water bath at a sufficient depth to prevent floating of ashes. The wetted material is subsequently removed from the water bath by the pertaining conveyer means, for example, a screw conveyer.

Thus, there may be provided, for example, an exit screw at the drum outlet, and next to the exit screw is provided a stuffing screw. The bottom end of the stuffing screw extends into the water bath and sufficiently deep into the fluid. It is of advantage to direct the stuffing screw perpendicularly downwardly so as to prevent plugging. In such an arrangement small particles are subject to gravity, and the screw will serve primarily to push the floating substances below the liquid level.

The residue conveyer means which removes the residue from the water bath can include a screw conveyer with the inlet end thereof being disposed beneath the liquid level and in the vicinity of the stuffing screw. The outlet end of the screw conveyer is arranged above the liquid level.

To ensure proper transport by the screws, the pertaining flights or walls are furnished with carrier bars. As well, the pitch of the exit screw may be varied to attain the desired objectives. When a variable pitch is selected for the exit screw, a greater distance is maintained between the initial flights and the material is accordingly less densely compacted and transported. This is also the region of the gas exhaust or removal. For proper transfer to the stuffing screw, the subsequent flights are more closely spaced on the exit screw.

Further embodiments of the invention and other inventive features are contained in the claims.

DESCRIPTION OF THE DRAWINGS

In the drawings, which illustrate that which is presently regarded as the best mode of carrying out the invention.

FIG. 5 is a side elevation showing the waste material receiving end of the drum.

FIG. 6 is a view in the direction of arrow "A" in FIG. 5 and showing the drive arrangement of the drum feed screw.

FIG. 7 is a side elevation of the residue removal end of the drum.

FIG. 8 is a top plan view of the residue removal end of the drum.

DESCRIPTION OF THE PREFERRED EMBODIMENTS

Figure 2:
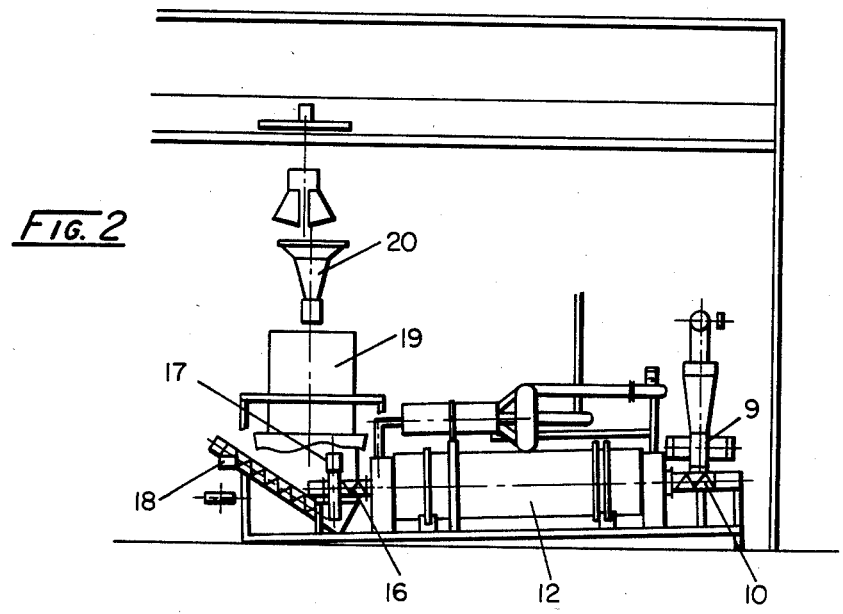
FIG. 2 is a side elevation along line II—II in FIG. 1.

The general arrangement of the apparatus in accordance with one embodiment of the present invention is shown in FIGS. 1 to 4. In the following description the individual process steps are also discussed.

Household, industrial, and similar waste material is introduced into a thermal-screw press, or similar multiple-chamber press having a transporting screw and heating and/or temperature control means. The press is generally designated by reference numeral 1. The material is initially subjected to a partial recycling, as required, for separation of metals, glass, and other reusable components. As required, a separation of the heavy fraction is carried out as well. Compacting of the material is carried out in the press at a temperature of from about 110° to about 150° C. by frictional pressure to yield a granulate of a size of from about 1 to about 50 mm.

The resulting water vapor emanating from the granulate, is passed through a vapor flue 2, a heat exchanger 3 for cooling and utilization of the heat-energy, and via a filter 4, to the condensating device 5. The water can subsequently be passed to the nearest clarification system, if it is not used in a suitable location in the processing cycle. In accordance with the prevailing conditions, the material is treated in press 1 to a value of at least 70%, dry-basis, from an initial value of from about 50 to about 65%. The granulated material is then conveyed from the press 1 and dried in a drying unit 6 to at least 84%, dry-basis. The waste heat produced in press 1, or the vapors in the heat exchanger 3, respectively, can be used for drying.

The resulting granulate is substantially odorless and can be stored over extended periods of time without decomposing. The screw conveyer 8 serves to transport the granulate from a granulate storage 7 to a bucket-wheel charging valve 9, or a similar gate means. The valve or gate 9 provides an air-tight inlet into a reactor drum 12, or similar thermal treatment vessel, with the granulate being transported into the drum 12 by a feed screw 10 (see FIG. 5). The drum 12 is furnished with an air inlet conduit 11 so that the drum can be used for combustion under sub-stoichiometric conditions. Control of the moisture content of the resulting gas is by means of conduits 13 and 14 which serve to meter water and steam, respectively, and which enter the entry and exit ends of the drum 12. Waste oil, other special wastes, and previously dewatered organic materials, may be added for treatment thereof in a environmentally acceptable manner through a separate line or conduit, not shown, leading into the drum 12.

The drum 12 is indirectly heated and is slowly rotated about its longitudinal axis which is slightly inclined in the direction of the exit or residue removal end. The granulate is subjected to a temperature in the range of from about 450° to about 600° C. in drum 12. Heat required in the preheat phase is from an oil or gas burner. Subsequently, for example, heat is provided either from a branch line of the gas converter for indirect heating, or, respectively, from the sub-stoichiometric combustion process with controlled air addition, through the conduit 11, in the drum 12 itself. The indirect heating of the drum 12 is by means of heating gases having a temperature of about 600° C. Such gases are passed through a system of conduits installed longitudinally in drum 12. The calorific value of the gases is transferred through the conduit walls to the material being treated in drum 12. The cooled heating gas is subsequently recycled with a corresponding re-heating.

The gas produced from the granulate is exhausted upwardly through a gas exit or exhaust 15 and is introduced into a gas converter 19 at a temperature in the range of from about 400° to about 500° C. The residues produced in drum 12 are removed by means of an air-tight conveyer system. This system includes an exit screw 16 which cooperates with a perpendicularly disposed stuffing or stopper screw, generally designated by the reference numeral 17. The stuffing screw 17 cooperates with a water bath 30 for wetting residue, and the wetted residue is removed from the plant by means of a screw conveyer 18. The screw conveyer 18 is also disposed with its material receiving end below the water level and is inclined with respect thereto. The conveyer 18 transports the residue to a storage, for example.

The further treatment of the gases emanating from the granulate is carried out in the gas converter 19 which is furnished with a bed of hot coal or similar fuel. For this, the gas converter 19 is supplied with coal or coke, and heated air is introduced through warm air conduit 21. The construction and operation of such gas converters are known in the art and need not be discussed further in this disclosure. The resulting combustion gas, or generator gas, is removed from the converter 19 via gas conduit 22. It is then treated in a purifier and cooler 23. The resulting purified gas is of a higher energy content and free of long-chain hydrocarbons. In purifier and cooler 23 the gas is substantially cleaned of entrained dust, and its temperature is lowered to such an extent that cooled and purified gas is introduced at a temperature of about 40° C. into a gas motor 24, or for operation of the like equipment. The gas motor 24 cooperates with a generator 25 for the production of energy.

Figure 1:
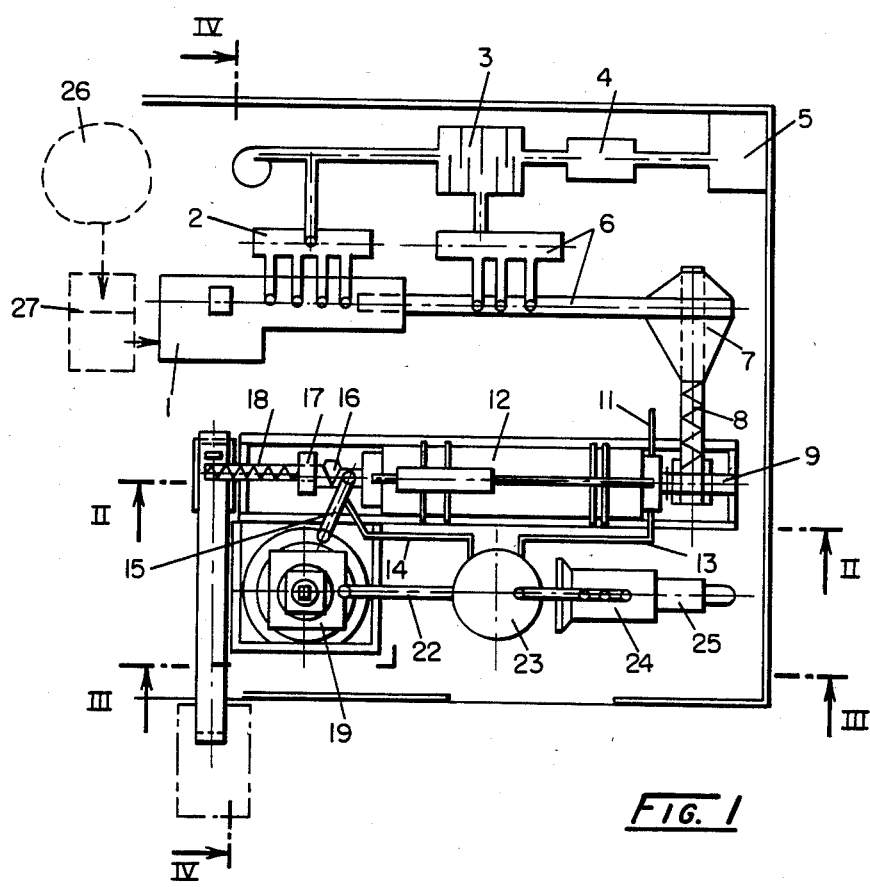
FIG. 1 is a top plan view of an apparatus in accordance with one embodiment of the present invention.
Figure 4:
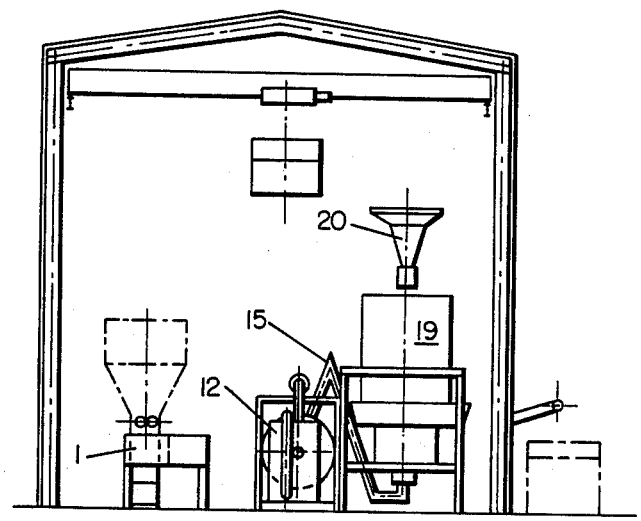
FIG. 4 is a side elevation along line IV—IV in FIG. 1.
Figure 3:
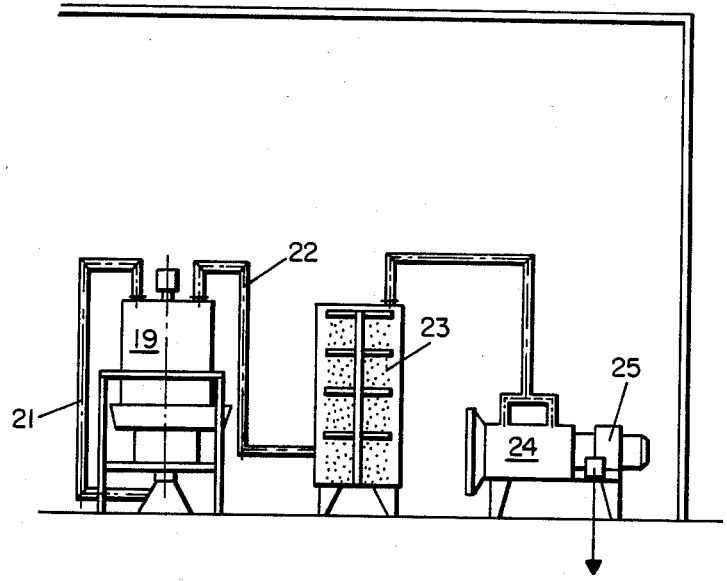
FIG. 3 is a view similar to FIG. 2, but along line III—III in FIG. 1.

As is indicated in dash outline in FIG. 1, an initially produced stockpile 26 of material to be treated in drum 12 would generally be comminuted in a shredder 27 prior to screw press 1. Of course, it is within the scope of this invention to feed waste materials directly into the press 1.

Turning to the FIGS. 5 and 6 showing the feeding arrangement for the granulate into the drum 12, the arrangement includes a valve 9, incorporating a multiple-chamber or bucket-wheel. Valve 9 is driven, via chain drive 28, by a motor 29 which is controlled in such a way that the feed rate into the drum 12 can be adjusted.

With reference to FIGS. 7 and 8, the flights or carrier members or bars on the exit screw 16 are more closely spaced at the rearward end, i.e., the end closest to drum 12, than near the forward end. Thus, some compacting of the residue is achieved by screw 16, and this material is further transported by stuffing screw 17. The stuffing screw extends perpendicularly with its lower end into the water bath 30 in a corresponding container. The flights or carriers of stuffing screw 17 push the material into and beneath the water level. The material is removed from the water bath 30 by the screw conveyer 18. Screw conveyer 18 is also disposed beneath the liquid level of the cooling medium with its receiving end, and it is inclined in the direction of its discharge end. A liquid-level indicator system and replenishing facilities, all not shown, can be used to maintain a required level of cooling liquid, e.g., water, in the water bath 30.

Reference in this disclosure to details of the specific embodiments is not intended to restrict the scope of the appended claims, which themselves recite those features regarded as essential to the invention.

I claim:

1. In a process in which a feed material of household, industrial and the like refuse is introduced into a low temperature carbonization reaction and the resultant reactant gas and residue are separately recovered, the improvement which comprises introducing said feed material into said reaction in particulate form in which the particle size is in a range of 1.0–50 mm having a dry substance content greater than 70%.

2. A process according to claim 1 in which the particles are in a size range of 2.0–10 mm and the dry substance content is greater than 84%.

3. A process according to claim 2 in which said refuse is size reduced to particulate form having a dry substance content greater than 70% and then further dried in a separate step to a dry substance content of greater than 84% using the heat generated during the size reduction.

4. A process according to claim 1 in which said separated reactant gas is further subjected to a cracking reaction.

5. A process according to claim 4 in which the moisture content of said reactant gas is controlled by the addition of water or steam to said carbonization reaction.

6. A process according to claim 5 in which said water or steam is obtained from the purification and cooling of the gas obtained from the cracking reaction.

7. A process according to claim 6 in which the gas obtained from the cracking reaction is used to indirectly heat said carbonization reaction.

8. An apparatus for subjecting a feed material of household, industrial and the like refuse to a low temperature carbonization reaction which comprises: a low temperature carbonization reactor adapted to be indirectly heated and having inlet and outlet ends; means associated with said inlet end for reducing said feed material to a particulate form having a particle size of 1.0–50 mm and a dry substance content greater than 70%; means for introducing said particulate feed material into said reactor; and means associated with said outlet end for separately recoverying reactant gas and residue.

9. An apparatus according to claim 8 in which the size reduction means is associated with means for drying the particulate feed material to a dry substance content greater than 84%, said drying means being associated with heat exchanging means adapted to receive hot vapors from said size reduction means.

10. An apparatus according to claim 8 in which means are associated with said outlet end for conveying recovered reactant gas to a gas cracker.

11. An apparatus according to claim 10 in which said outlet end is associated with means for conveying recovered residue through a water bath.

12. An apparatus according to claim 11 in which said conveying means comprises a first screw conveying means having its discharge end beneath the surface of said water bath cooperating with a second screw conveying means having its receiving end beneath the surface of said water bath.

* * * * *